Feb. 27, 1962 R. P. BURR 3,023,335
PRINTED CIRCUIT ARMATURE
Filed May 25, 1959 3 Sheets-Sheet 1
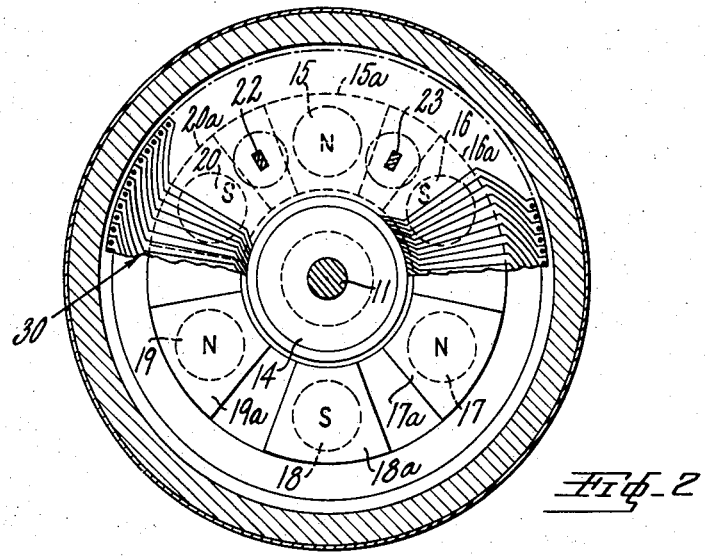
Fig. 2
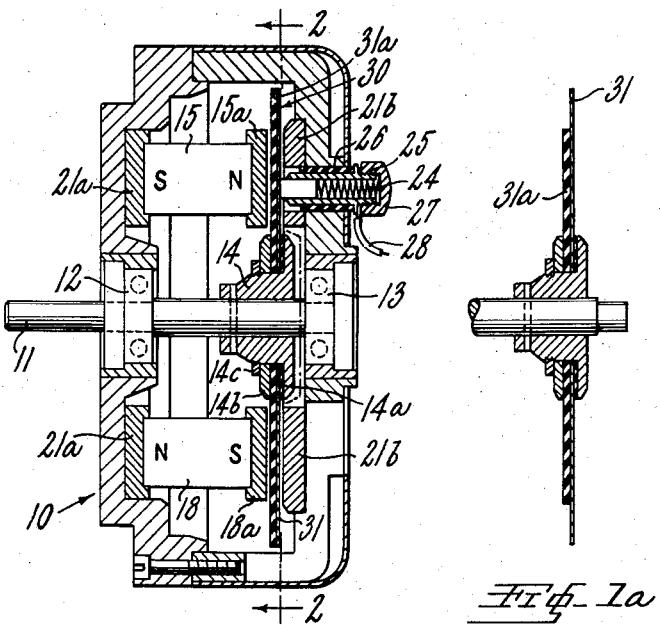
Fig. 1
Fig. 1a
INVENTOR.
ROBERT P. BURR
BY
Charles A. Blank
ATTORNEY Feb. 27, 1962 R. P. BURR 3,023,335
PRINTED CIRCUIT ARMATURE Filed May 25, 1959 3 Sheets-Sheet 2

INVENTOR.
ROBERT P. BURR
BY
Charles A. Black
ATTORNEY

Feb. 27, 1962 R. P. BURR 3,023,335
PRINTED CIRCUIT ARMATURE
Filed May 25, 1959 3 Sheets-Sheet 3

INVENTOR.
ROBERT P. BURR
BY
Charles A. Blank
ATTORNEY

United States Patent Office 3,023,335
Patented Feb. 27, 1962

3,023,335
PRINTED CIRCUIT ARMATURE
Robert P. Burr, Huntington, N.Y., assignor to Printed Motors, Inc., New York, N.Y., a corporation of Delaware
Filed May 25, 1959, Ser. No. 815,533
6 Claims. (Cl. 310—268)

This invention relates to armatures for electrical rotating machines and, more particularly, to armatures for direct-current motors and generators. The invention is particularly directed to armatures having printed-circuit, plated or etched conductors.

A copending application Serial No. 691,434 of F. H. Raymond and J. Henry-Baudot, filed October 21, 1957, and entitled "Electrical Rotating Machines," describes and claims electrical rotating machines utilizing printed-circuit armatures. Also, printed-circuit armatures suitable for use in electrical rotating machines are described and claimed in a copending application Serial No. 792,733, entitled "Conductive Device," filed February 12, 1959 by Robert L. Swiggett, now Patent 2,970,238. In the aforesaid Swiggett application, an armature is described having conductive patterns coated on the faces of a thin sheet of insulating material which is adherent to and is supported by a disk of insulating material. While such an armature provides satisfactory operation over a wide range of operating conditions, under heavy load conditions it may overheat. Expansion of the conductive material may temporarily or permanently stretch the attached supporting disk of insulating material and cause lateral deformation of the disk of insulating material under extreme operating conditions. During operation, the deformed armature may undesirably rub against the pole pieces of the magnet.

It is an object of the present invention to provide a new and improved armature for an electrical rotating machine which is not subject to lateral deformation at relatively high operating temperatures.

It is another object of the invention to provide a new and improved armature for a direct-current motor or generator which may be easily assembled and disassembled.

In accordance with the invention, an armature for an electrical rotating machine comprises a thin sheet of insulating material having surfaces coated with conductive patterns which have inner and outer boundaries and which have interconnections disposed in a plurality of rows in the patterns near the boundaries and a disk disposed against the conductive pattern on one surface of the sheet and displaceable relative thereto for supporting the sheet.

For a better understanding of the present invention, together with other and further objects thereof, reference is made to the following description taken in connection with the accompanying drawings, and its scope will be pointed out in the appended claims.

Referring to the drawings:

FIG. 1 is a sectional view along a central plane of a direct-current motor utilizing a printed armature constructed in accordance with the present invention with one of the brush mounts shown in section;

FIG. 1a is a fragmentary sectional view of an armature constructed in accordance with a modified form of the invention;

FIG. 2 is a sectional view, taken along line 2—2 of FIG. 1 with the armature partly broken away;

Figure 3:
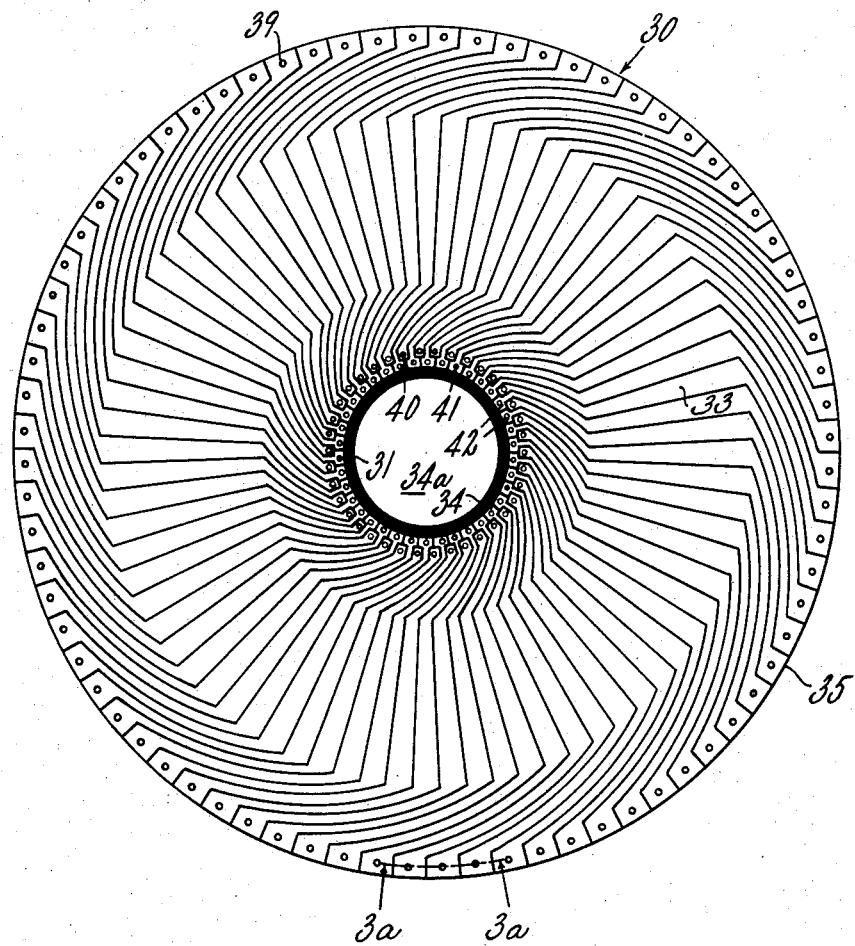
FIG. 3 is a plan view of the armature utilized in the FIG. 1 motor.

Referring now more particularly to FIG. 1 of the drawings, the direct-current motor there represented comprises a motor housing 10 supporting a central shaft 11 journaled in suitable bearings 12, 13. An armature 30 constructed in accordance with the invention is mounted on a suitable supporting hub 14 between an insulating washer 14a, a clamp ring 14b, and threaded nut 14c. As is apparent in FIG. 2, the motor is, for example, a six-pole motor utilizing six permanent magnets, 15 to 20, inclusive, to establish a magnetic field. Suitable pole pieces 15a to 20a, inclusive, are attached to the magnets at one end as represented in FIG. 2. An annulus 21a of ferromagnetic material is attached to the other end of the magnets to provide a path for magnetic flux. The magnets are mounted to provide fields of alternate polarity through adjacent regions of the armature as represented by the north-south symbols N-S of FIGS. 1 and 2. A ferromagnetic annulus 21b, is positioned on the other side of the armature from the magnets to minimize the air gap in the magnetic field and to complete the path for magnetic flux. Suitable brushes 22, 23, represented in section in FIG. 2, are positioned approximately midway between magnets 20 and 15 and between magnets 15 and 16 to supply current to the motor, as will be described in detail subsequently.

Referring to FIG. 1, brush 23 is maintained in position by a suitable spring 24 mounted in a sleeve 25 within an insulating support 26. A cap of insulating material 27 is threaded on the sleeve 25 for clamping an electrical lead 28 thereto. The brush 22, and a corresponding electrical lead (not shown) are similarly mounted and connected electrically.

Referring now more particularly to FIG. 3 of the drawings, the armature 30 constructed in accordance with the invention is represented in plan view. The armature comprises an insulating member having surfaces coated with conductive patterns preferably having substantially circular inner and outer boundaries and which have interconnections comprising conductive coatings bounding apertures through the insulating member preferably disposed in a plurality of circular rows in the patterns near the boundaries. More particularly, the insulating member comprises, for example, a suitable sheet material such as Mylar, which is a commercially available polyester film made by E. I. du Pont de Nemours & Company, Inc., or a sheet of epoxy-glass laminate. The insulating member 31 is apparent in FIG. 3a which is a sectional view of a portion of the armature along lines 3a—3a of FIG. 3. The Mylar sheet preferably is a film having a thickness of, for example, .005 inch. The Mylar sheet is also represented by the lines representing conductor boundaries in FIG. 3. The conductive pattern represented in FIG. 3 comprises, for example, 76 conductors on one surface of the insulating sheet and this pattern is repeated on the other side of the sheet 31, as partially represented in FIG. 4, which is a fragmentary view of the armature and its conductive patterns. Thus, the armature pattern on each side of the sheet 31 appears as represented in FIG. 3 when each pattern is viewed from the side of the sheet 31 on which the pattern appears. The radial portions 33 of the conductors on both sides of the armature may coincide. The conductive patterns will be described in detail subsequently.

The flexible insulating sheet 31 has a centrally located aperture 34a and is disposed against a more rigid insulating disk 31a of circular shape but is not adherent to the disk 31a. The disk 31a may, for example, be an epoxy-glass laminate with a centrally located aperture, and having a thickness of, for example, .03 inch. Means comprising the hub 14, insulator 14a, clamp ring 14b and threaded nut 14c clamp the insulating sheet 31 against the disk 31a along the periphery of the armature shaft. As represented in FIG. 1a, the disk 31a need not extend beyond the region of the pole pieces 15a, 18a of FIG. 1 and may be of smaller diameter than the coated insulating sheet 31 to provide a reduction of armature inertia, if desired. The disk 31a laterally supports the sheet 31 which is radially displaceable relative to the disk 31a. Thus, thermal dimensional changes of the conductive patterns on the insulating sheet can occur radially with respect to the disk 31a. Accordingly, thermal expansions of the conductive patterns cannot stretch and bend the disk 31a laterally beyond its elastic limit. Thus, permanent deformation of the armature due to variations of operating temperature over a wide range for example, 70° F.–200° F., is minimized. The insulating sheet 31 is stretched but its insulating qualities are not affected because they are highly resistant to temperatures of this order of magnitude. The sheet 31 is sufficiently thin that any deformation of that sheet does not laterally deform the armature.

The conductive patterns of the armature preferably have substantially circular inner and outer boundaries 34 and 35.

Figure 3A:
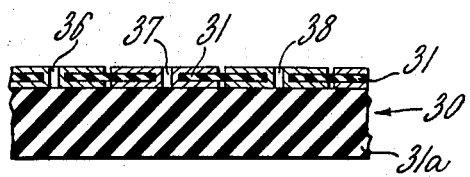
FIG. 3a is an enlarged sectional view taken along line 3a—3a of FIG. 3.

Interconnections between the conductive patterns comprise conductive coatings, for example, 36, 37, and 38 of FIG. 3a, bounding apertures through the insulating material and disposed in a plurality of substantially circular rows 39, 40 and 41 near the boundaries. The interconnections in the outermost circle 39 are connected to all conductors of the conductive patterns. The interconnections in the innermost circle 41 are connected to alternate conductors in each conductive pattern. The interconnections in the other inner circle 40 are connected to conductors intervening the alternate conductors in the conductive patterns. The alternate conductors connected to the innermost circle 41 are terminated in closely spaced adjacent conductive regions 42, 42 separated by insulating material. The intervening conductors are terminated on each face of the sheet 31 by conductive regions separated by the alternate conductors and insulating material.

Thus it will be seen in FIG. 3 that alternate connections to the conductors are staggered, that is, connections to alternate conductors are in the innermost circle 41 and connections to the intervening conductors are in the adjacent circle 40, preferably midway between the apertures of circle 41. This construction of the armature is of importance because it provides substantial regions of the conductors in which coated apertures are located. The apertures may, therefore, be of substantial size, for example, .02 inch on a circle of .7 inch diameter, permitting a coating of sufficient thickness and area to conduct the necessary current. This construction of the conductors with the apertures arranged in a plurality of circular rows near the central aperture 34a makes the manufacture of small armatures commercially practical.

Figure 4:
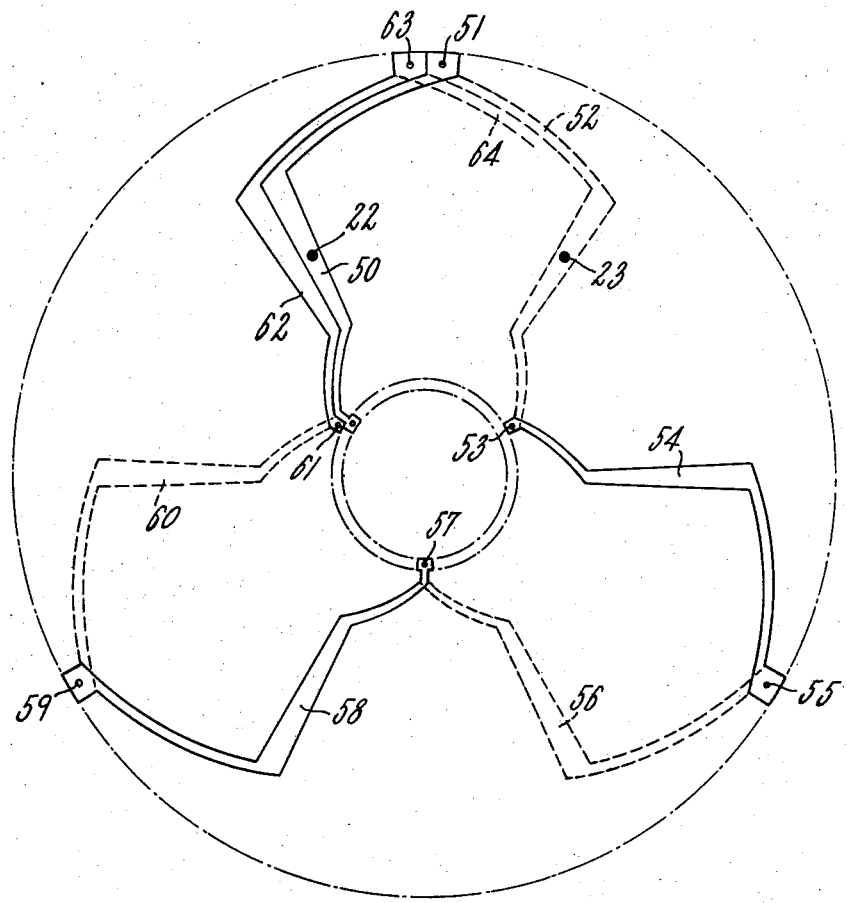
FIG. 4 is a fragmentary plan view of the FIG. 3 armature to represent conductive patterns on both sides of the armature.

The conductor pattern and the corresponding pattern for current flow through the armature will be partially traced with reference to FIG. 4. Assuming current to enter the motor at brush 22 disposed in contact with conductor 50, current flows along conductor 50 through aperture 51 to conductor 52 on the other side of the insulating sheet, through aperture 53 along conductor 54, through aperture 55 along conductor 56 on the other side of the insulating sheet, through aperture 57 along conductor 58, through aperture 59 along conductor 60 on the other side of the insulating sheet, and through aperture 61 along conductor 62 adjacent conductor 50. Current continues along conductor 62 through aperture 63 along conductor 64 on the other side of the insulating sheet adjacent conductor 52. Current flow continues in this manner through the conductors of the armature until it reaches the final conductor (not shown) on the face of the same sheet as conductor 50 and directly under brush 23.

A method of manufacturing the armature will be briefly described. A sheet of insulating material is drilled, perforated or punched to form apertures in the pattern represented in FIG. 3. The sheet is then coated with a copper film on all exposed surfaces, including the walls of the apertures, to a thickness of approximately .00001 inch by immersion in an electrolytic copper deposition solution ordinarily employed in the manufacture of printed circuits. The copper-coated faces are then coated with a suitable screen printing-ink plating resist, known to the art, which resists copper electroplating and which is printed on the copper to form the pattern to be etched, represented by the black lines of FIG. 3. The armature is then copper-plated on its faces and through its apertures. After plating to the desired copper thickness (for example, approximately .005 for a three inch diameter armature), the part is removed from the electroplating bath and the ink is cleaned off, leaving exposed the thin electrolytic copper film which was under the ink. The armature is then immersed briefly in an etching solution, which removes the thin electrolytic copper film which was under the ink to form the conductors represented in FIG. 3.

It should also be understood that the conductive coating on the surfaces of the insulating sheet may comprise, for example, a copper-foil material which is laminated to the insulating sheet and is subsequently etched. Also, the conductively coated apertures through the insulating material may be filled with conductive or insulating material, if desired.

From the foregoing description it will be apparent that armatures constructed in accordance with the invention are substantially free from lateral deformation which might otherwise occur due to variations of operating temperature over a wide range, causing the armature to rub against the pole pieces of the magnets. Armatures constructed in accordance with the invention have the further advantage that they are less costly because there is no laminating operation required to assemble the coated insulating sheet and the supporting insulating disk. The motor operates with a considerably smaller noise output because the acoustic transmission between coated sheet and the supporting disk is impaired due to lack of adhesive. Also, at high speeds centrifugal force tends to flatten the relatively flexible coated insulating sheet, providing good high speed operation. Also, armatures constructed in accordance with the invention have the advantage that either side of the coated insulating sheet may be placed in contact with the brushes and used for commutation. If one conductive pattern becomes slightly worn, the armature may be readily disassembled, the coated sheet reversed, and the other conductive pattern used for commutation. The inertia of the armature may be minimized by utilizing a supporting disk which does not extend beyond the magnet pole pieces. Armatures for diverse purposes may be constructed by utilizing a conductively coated insulating film with supporting disks selected from a wide range of insulating materials for example, glass, ceramic, epoxy, Bakelite or paper compositions. Also, the supporting disk may be conductive and covered by insulating material to provide eddy-current damping.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. An armature for an electrical rotating machine comprising: a thin sheet of insulating material having surfaces coated with conductive patterns which have inner and outer boundaries and which have interconnections disposed in a plurality of rows in said patterns near said boundaries, and a disk disposed against the conductive pattern on one surface of said sheet and displaceable relative thereto for laterally supporting said sheet.

2. An armature for an electrical rotating machine comprising: a thin sheet of insulating material having surfaces coated with conductive patterns which have substantially circular inner and outer boundaries and which have interconnections comprising conductive coatings bounding apertures through said insulating material disposed in a plurality of substantially circular rows in said patterns near said boundaries, and a circular insulating disk disposed against the conductive pattern on one surface of said sheet and radially displaceable relative thereto for laterally supporting said sheet.

3. An armature for an electrical rotating machine comprising: a thin sheet of insulating material having surfaces coated with conductive patterns which have substantially circular inner and outer boundaries and which have interconnections comprising conductive coatings bounding apertures through said insulating material disposed in a plurality of substantially circular rows in said patterns near said boundaries, and a circular insulating disk disposed against the conductive pattern on one surface of said sheet for laterally supporting said sheet, said sheet being radially displaceable with respect to said disk to allow thermal dimensional changes of said sheet with respect to said disk, whereby lateral deformation of the armature due to variations of operating temperature over a wide range is minimized.

4. An armature for an electrical rotating machine comprising: a thin sheet of insulating material having surfaces coated with conductive patterns which have inner and outer boundaries and which have interconnections comprising conductive coatings bounding apertures through said insulating material disposed in a plurality of rows in said patterns near said boundaries, and an insulating disk disposed against the conductive pattern on one surface of said sheet for laterally supporting said sheet, said disk being non-adherent to said sheet to allow thermal dimensional changes of said conductive patterns with respect to said disk, whereby lateral deformation of the armature due to variations of operating temperature over a wide range is minimized.

5. An armature for an electrical rotating machine comprising: a rotary shaft, a thin sheet of insulating material having a centrally located aperture of substantially circular boundary for mounting the sheet on said shaft and having surfaces coated with conductive patterns which have substantially circular inner and outer boundaries and which have interconnections comprising conductive coatings bounding apertures through said insulating material disposed in a plurality of substantially circular rows in said patterns near said boundaries, a circular insulating disk having a centrally located aperture for mounting said disk on said shaft and disposed against the conductive pattern on one surface of said sheet for laterally supporting said sheet, means for clamping said sheet to said disk along the periphery of said shaft, said sheet being radially displaceable with respect to said disk to allow thermal dimensional changes of said conductive patterns with respect to said disk, whereby lateral deformation of the armature due to variations of operating temperature over a wide range is minimized.

6. An armature for an electrical rotating machine comprising: a thin sheet of insulating material having surfaces coated with conductive patterns which have substantially circular inner and outer boundaries and which have interconnections comprising conductive coatings bounding apertures through said insulating material disposed in a plurality of rows in said patterns near said boundaries, and a circular insulating disk of smaller diameter than said sheet and disposed against the conductive pattern on one surface of said sheet for laterally supporting said sheet, said sheet being radially displaceable with respect to said disk to allow thermal dimensional changes of said sheet with respect to said disk, whereby lateral deformation of the armature due to variations of operating temperature over a wide range is minimized.

References Cited in the file of this patent

UNITED STATES PATENTS 2,786,187    Nims _____ Mar. 19, 1957

OTHER REFERENCES

"Printed Circuit Armature," Electronics Design, March 4, 1959.

UNITED STATES PATENT OFFICE
CERTIFICATE OF CORRECTION

Patent No. 3,023,335                          February 27, 1962

Robert P. Burr

It is hereby certified that error appears in the above numbered patent requiring correction and that the said Letters Patent should read as corrected below.

Column 4, lines 9, 21 and 23, for "electrolytic", each occurrence, read -- electroless --.

Signed and sealed this 23rd day of October 1962.

(SEAL)
Attest:

ERNEST W. SWIDER
Attesting Officer

DAVID L. LADD
Commissioner of Patents